US00RE35675E

United States Patent [19]

Kitada

[11] E Patent Number: Re. 35,675

[45] Reissued Date of Patent: Dec. 2, 1997

[54] ENGINE COOLING SYSTEM FOR MOTORCYCLE

[75] Inventor: Mitsuo Kitada, Hamamatsu, Japan

[73] Assignee: Yamaha Hatsudoki Kabushiki Kaisha, Iwata, Japan

[21] Appl. No.: 861,555

[22] Filed: Apr. 1, 1992

Related U.S. Patent Documents

Reissue of:

[64] Patent No.: 4,723,617
Issued: Feb. 9, 1988
Appl. No.: 834,209
Filed: Feb. 27, 1986

[30] Foreign Application Priority Data

Mar. 4, 1985 [JP] Japan ..... 60-42049

[51] Int. Cl.[6] ..... B60K 11/06

[52] U.S. Cl. ..... 180/68.1; 180/229

[58] Field of Search ..... 180/68.1, 68.2, 180/68.3, 229, 225, 219, 291, 296; 55/385.3, DIG. 28

[56] References Cited

U.S. PATENT DOCUMENTS

| | | | |
|---|---|---|---|
| Re. 31,995 | 10/1985 | Tominaga et al. | 180/225 |
| 4,531,606 | 7/1985 | Watanabe | 180/215 |
| 4,585,086 | 4/1986 | Hiramatsu | 180/219 |
| 4,597,466 | 7/1986 | Yamada | 180/225 |

FOREIGN PATENT DOCUMENTS

| | | | |
|---|---|---|---|
| 89226 | 5/1984 | Japan | 180/68.3 |
| 138714 | 8/1919 | United Kingdom | 180/229 |

*Primary Examiner*—Karin L. Tyson
*Attorney, Agent, or Firm*—Knobbe, Martens, Olson & Bear

[57] ABSTRACT

A motorcycle having an improved frame and fuel tank arrangement that define a ram air inlet channel for delivering cooling air to the engine induction system.

8 Claims, 3 Drawing Sheets

ENGINE COOLING SYSTEM FOR MOTORCYCLE

Matter enclosed in heavy brackets [ ] appears in the original patent but forms no part of this reissue specification; matter printed in italics indicates the additions made by reissue.

BACKGROUND OF THE INVENTION

This invention relates to an engine cooling system for motorcycles and more particularly to an improved system for directing cool air to the air induction system of a motorcycle engine.

The compactness of motorcycles is well known. Because of their extremely compact nature, there are a number of problems to be overcome in designing a successful motorcycle. One of the main problems is designing the engine mounting and air flow system in such a way as to insure that a good supply of clean cool fresh air is provided to the engine induction system. Recently, it has been the practice to position the carburetors or induction system for the engine to the rear of the engine so that the air cleaners and air inlet devices are positioned in the area of the rider's seat so that they will be protected from the intrusion of foreign matter. However, such a location makes it difficult to provide an adequate supply of cool air to the engine induction system.

It is, therefore, a principal object of this invention to provide an improved motorcycle engine cooling system.

It is another object of this invention to provide an improved motorcycle arrangement for permitting a rearwardly positioned air inlet and yet insuring adequate air supply to the engine.

It is another object of this invention to design the motorcycle frame and associated components so that they act as a ram air inlet device for the engine induction system.

SUMMARY OF THE INVENTION

This invention is adapted to be embodied in a motorcycle having a frame that is comprised of a head pipe and a pair of main frame members that have a box section configuration and which are fixed at their forward ends to the head pipe. The main frame members extend rearwardly and downwardly from the head pipe and diverge from each other in the vicinity of their connection to the head pipe. A front wheel is dirigibly supported by the head pipe and an engine is carried by the frame and positioned at least in substantial part below the main frame member. The engine has a charge forming system including a rearwardy extending air inlet positioned at least in substantial part below the upper surfaces of the main frame members. A fuel tank is supported upon the main frame members and above the engine and the engine air inlet. The fuel tank lower surface and the side surfaces of the main frame members define a ram air inlet channel for directing ram air to the engine air inlet.

DETAILED DESCRIPTION OF THE PREFERRED EMBODIMENT

Figure 4:
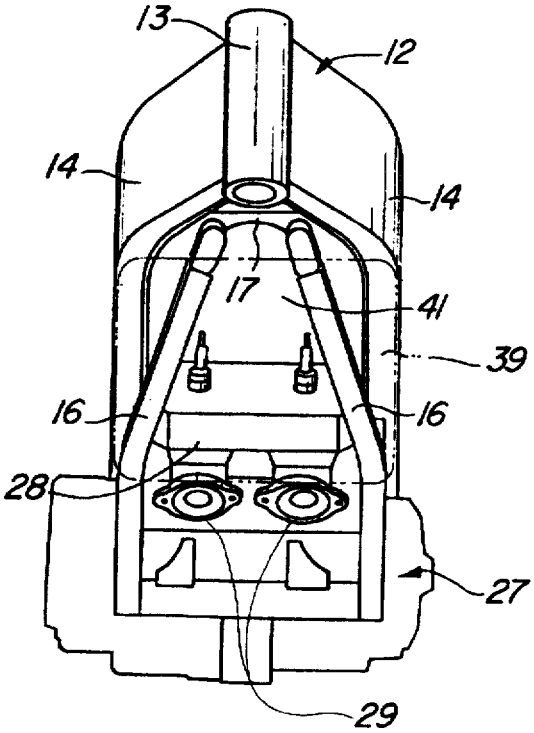
FIG. 4 is a view taken in the direction of the arrow 4 in FIG. 2.
Figure 5:
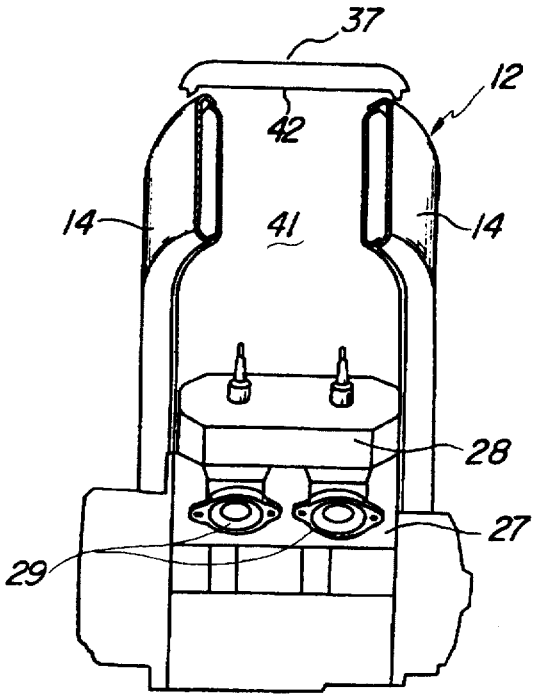
FIG. 5 is a cross-sectional view taken along the line 5—5 of FIG. 2.

A motorcycle constructed in accordance with an embodiment of the invention is identified generally by the reference numeral 11. The motorcycle 11 includes a frame assembly, indicated generally by the reference numeral 12, which is a welded up assembly that includes a head pipe 13. Affixed to the head pipe 13 are a pair of main frame members 14 that have a generally box like configuration in cross-section and which may be conveniently formed by welding a pair of stamped sections together. The main frame members 14 diverge from each other in the area where they are affixed to the head pipe 13 and then extend parallel for a substantial portion of their length as may be best seen in FIGS. 3 through 5. In addition, the main frame members 14 extend generally rearwardly and downwardly from the head pipe 13.

The main frame members 14 are joined together at their rearward ends by welding them to a casting 15. In addition, a pair of down tubes 16 are connected to the main frame members 14 by means of a briding reinforcing member 17. The down tubes 16 are connected at their other ends to the casting 15 in an appropriate manner.

A pair of seat rails 18 extend rearwardly from the main frame members 14 and are integrally connected at their rear ends. The seat rails 18 are supported at each side of the frame assembly 12 by means of seat pillar rails 19 that extend between the casting 15 and the rearward portions of the seat rails 18.

A front wheel 21 is dirigibly supported from the frame 12 and specifically from the head pipe 13 by means of a front fork 22. A handlebar assembly 23 is connected to the front fork 22 for steering of the front wheel 21 in a known manner.

A rear wheel 24 is supported by a trailing arm assembly 25 which is, in turn, pivotally journaled by the frame casting 15 by means of a pair of pivot shafts 26.

An engine, indicated generally by the reference numeral 27, is supported by the frame assembly 12 in a location that is substantially beneath the main frame members 14 so as to provide a low center of gravity. The engine 27 includes a cylinder block and head assembly 28 that defines a pair of aligned cylinders that extend transversely across the width of the frame 12 in the area between the main frame members 14 and beneath them. The engine 27 and specifically the cylinder block, cylinder head assembly 28 is provided with a pair of forwardly facing exhaust ports 29 that cooperate with an exhaust manifold, muffler arrangement 31 that discharges the exhaust gases rearwardly of the motorcycle 11.

Figure 1:
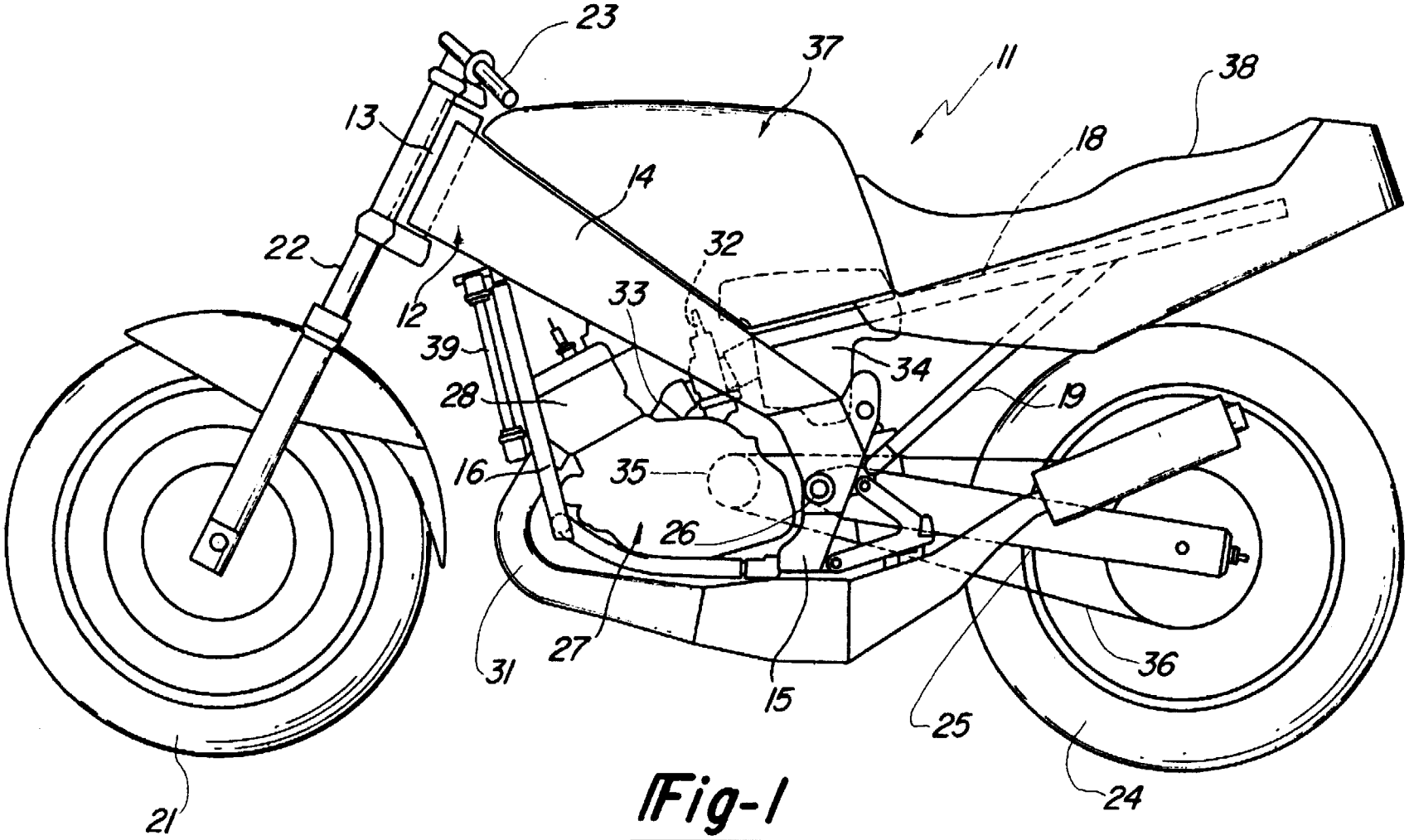
FIG. 1 is a side elevational view of a motorcycle constructed in accordance with an embodiment of the invention.
Figure 2:
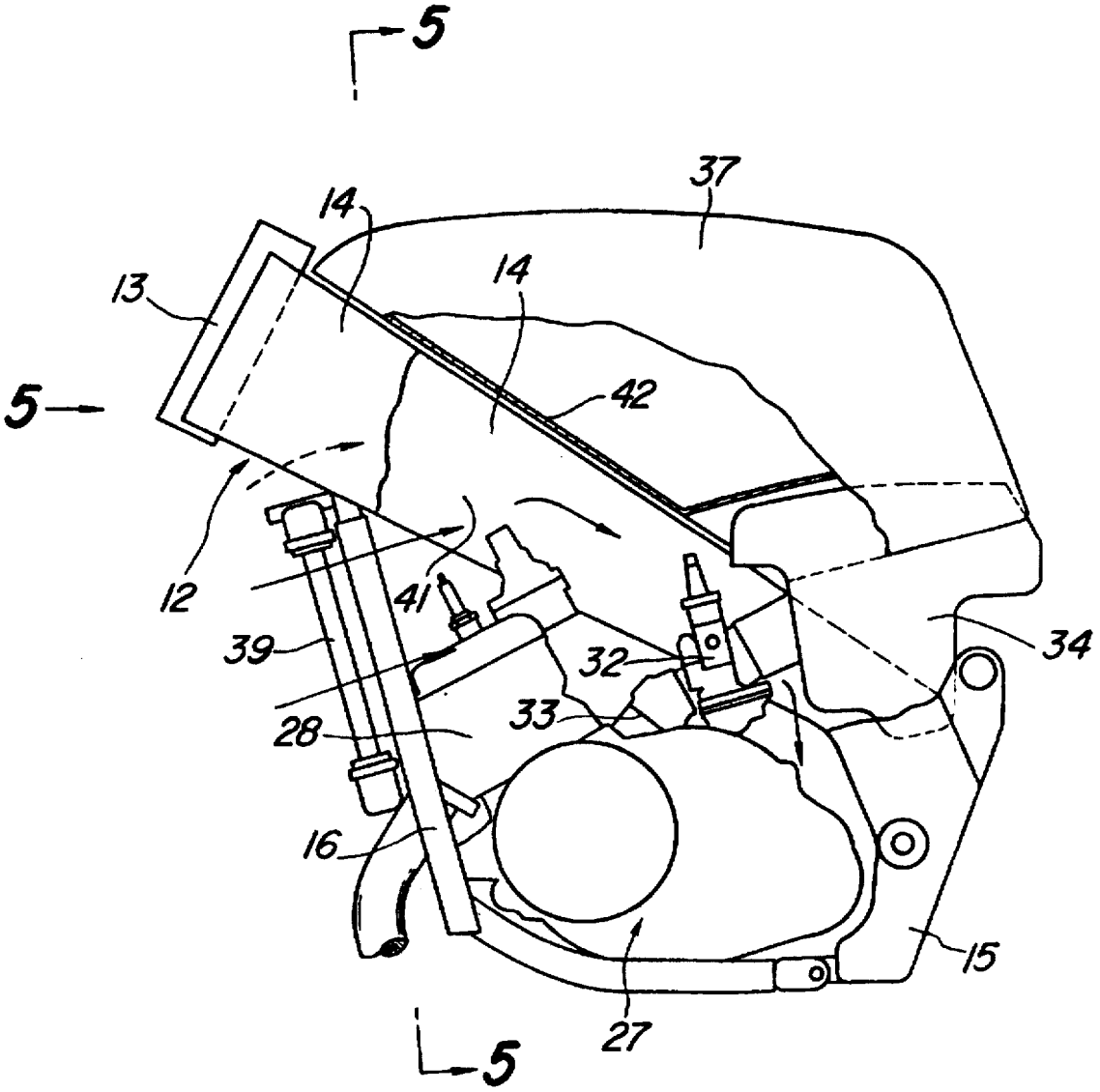
FIG. 2 is an enlarged side elevational view, with portions broken away and other portions shown in section, showing the engine air induction system.
Figure 3:
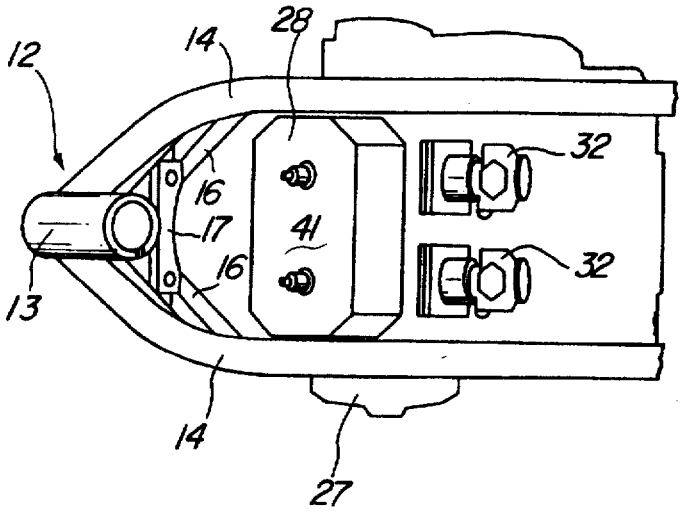
FIG. 3 is a top plan view of the frame and engine relationship with certain components removed so as to more clearly show the construction.

The engine 27 is also provided with a charge forming and induction system in the form of a pair of carburetors 32 *having rearwardly facing air inlet openings, as clearly seen in FIGS. 2 and 3,* that deliver a fuel/air mixture to the crankcase of the engine 27 by means of an induction manifold 33. In the illustrated embodiment, the engine 27 is of the two-cycle type and this is why the carburetors 32 discharge their fuel/air mixture into the crankcase of the engine 27. It is to be understood, however, that this invention may also be practiced with four-cycle engines having carburetors that are positioned to the rear of the cylinder block and beneath in substantial part the upper portions of the main frame members, for a reason which will become apparent. The carburetors 32 are provided with an air inlet device in the form of a combined air cleaner and air silencer 34 which is also positioned at least in part below the main frame members 14 and is positioned rearwardly of the carburetors 32.

The engine 27 includes a combined crankcase and transmission assembly that drives an output shaft 35 which, in turn, drives the rear wheel 24 by means of a chain drive 36.

A fuel tank, indicated generally by the reference numeral 37, is supported on the upper sides of the main frame members 14 and rearwardly of the head pipe 13. A seat 38 is carried by the seat rails 18 and seat pillar rails 19 rearwardly of the fuel tank 37.

The engine 27 is at least in part water cooled and, for this purpose, a cooling radiator 39 is supported by the down tubes 16 forwardly of the engine 28 and beneath the main frame members 14.

It should be readily apparent from the foregoing description that the overall configuration of the motorcycle places the carburetors 32 and their air inlet devices 34 in a well protected position. For the same reason, however, conventional motorcycles having this same placement have difficulty in obtaining an adequate source of cool air to the air inlet devices 34. However, in accordance with the invention, the construction of the motorcycle 11 is such that a cooling air inlet channel, indicated generally by the reference numeral 41, is provided for delivering a source of plentiful ram air to the engine induction system. The air channel 41 is defined by the inner side surfaces of the main frame members 14 and a lower surface 42 of the fuel tank 37. As may be seen in FIG. 2, the inlet to this cooling channel is positioned at least in part above the radiator 39 and hence it is insured that there will be a good supply of air for the engine induction system. In addition, this channel is configured in such a way as to create a ram effect for the inlet air since it tapers downwardly and rearwardly and is disposed with its open mouth forwardly of the motorcycle so that ram air will be well delivered to the engine induction system. Thus, even though the motorcycle 11 has a very compact configuration, there will be an adequate supply of cooling air for the engine and also for the engine induction system.

*As may be seen from FIG. 2, a portion of the air flowing through the air inlet channel 41 passes through the radiator 39 while another portion, as already noted, passes over the radiator. The air flowing through the radiator is indicated in this figure by solid line arrows while the air flowing around the radiator is noted by broken line arrows. This air is supplied to the engine induction system.*

The frame assembly 12 may be formed from any suitable material but preferably is formed from either aluminum castings and stampings or from steel.

It is to be understood that the foregoing description is that of a preferred embodiment of the invention and that various changes and modifications may be made without departing from the spirit and scope of the invention, as defined by the appended claims.

I claim:

1. A motorcycle having a frame comprised of a head pipe, a pair of box section main frame members having inwardly facing side surfaces depending from respective upper surfaces, said main frame members being fixed at their front ends to said head pipe and extending rearwardly and downwardly therefrom, said inwardly facing side surfaces and said main frame members diverging from each other in the vicinity of their connection to said head pipe, a front wheel dirigibly supported by said head pipe, an engine carried by said frame and positioned at least in substantial part below said main frame members, said engine having a charge forming system including a rearwardly extending air inlet positioned at least in substantial part below said upper surfaces of said main frame members, a rear wheel suspended from said main frame member at the rear end thereof, and a fuel tank supported upon said main frame members and having a lower surface extending above said engine and said air inlet, said lower surface of said fuel tank and said inwardly facing side surfaces of said main frame members defining a forwardly opening air inlet channel for delivering ram air to said air inlet.

2. A motorcycle as set forth in claim 1 wherein the air inlet channel is inclined downwardly and rearwardly from an upwardly positioned opening to a rearwardly positioned outlet in registry with the air inlet.

3. A motorcycle as set forth in claim 1 wherein the air inlet includes a carburetor.

4. A motorcycle as set forth in claim 3 wherein the air inlet includes an air silencer for delivering air to the carburetor.

5. A motorcycle as set forth in claim 4 wherein the air inlet channel is inclined downwardly and rearwardly from an upwardly positioned opening to a rearwardly positioned outlet in registry with the air inlet.

*6. A motorcycle as set forth in claim 1 wherein the forward opening of the air inlet channel is defined by said facing side surfaces and said fuel tank lower surface.*

*7. A motorcycle as set forth in claim 1 wherein the engine is water cooled and further including a radiator positioned forwardly of the engine and below the facing side surfaces of the frame members and wherein a portion of the air directed to the air inlet passes through the radiator.*

*8. A motorcycle as set forth in claim 7 wherein the forward opening of the air inlet channel is defined by said facing side surfaces and said fuel tank lower surface.*

* * * * *